Oct. 18, 1927.

C. S. AFFHOLDER 1,645,678

DRY CELL CORE MAKING MACHINE

Filed Feb. 7, 1927

7 Sheets-Sheet 1

Inventor
Clements S. Affholder
By Dyrenforth, Lee, Chritton & Wiles
Attys

Oct. 18, 1927. 1,645,678
C. S. AFFHOLDER
DRY CELL CORE MAKING MACHINE
Filed Feb. 7, 1927      7 Sheets-Sheet 2

Inventor
Clement S. Affholder,
By Wynneforth, Lee, Chritton
& Niles, Attys.

Oct. 18, 1927. 1,645,678
C. S. AFFHOLDER
DRY CELL CORE MAKING MACHINE
Filed Feb. 7, 1927 7 Sheets-Sheet 3

Inventor:
Clements S. Affholder,
By Dynforth, Lee, Chritten, Wiles Attys.

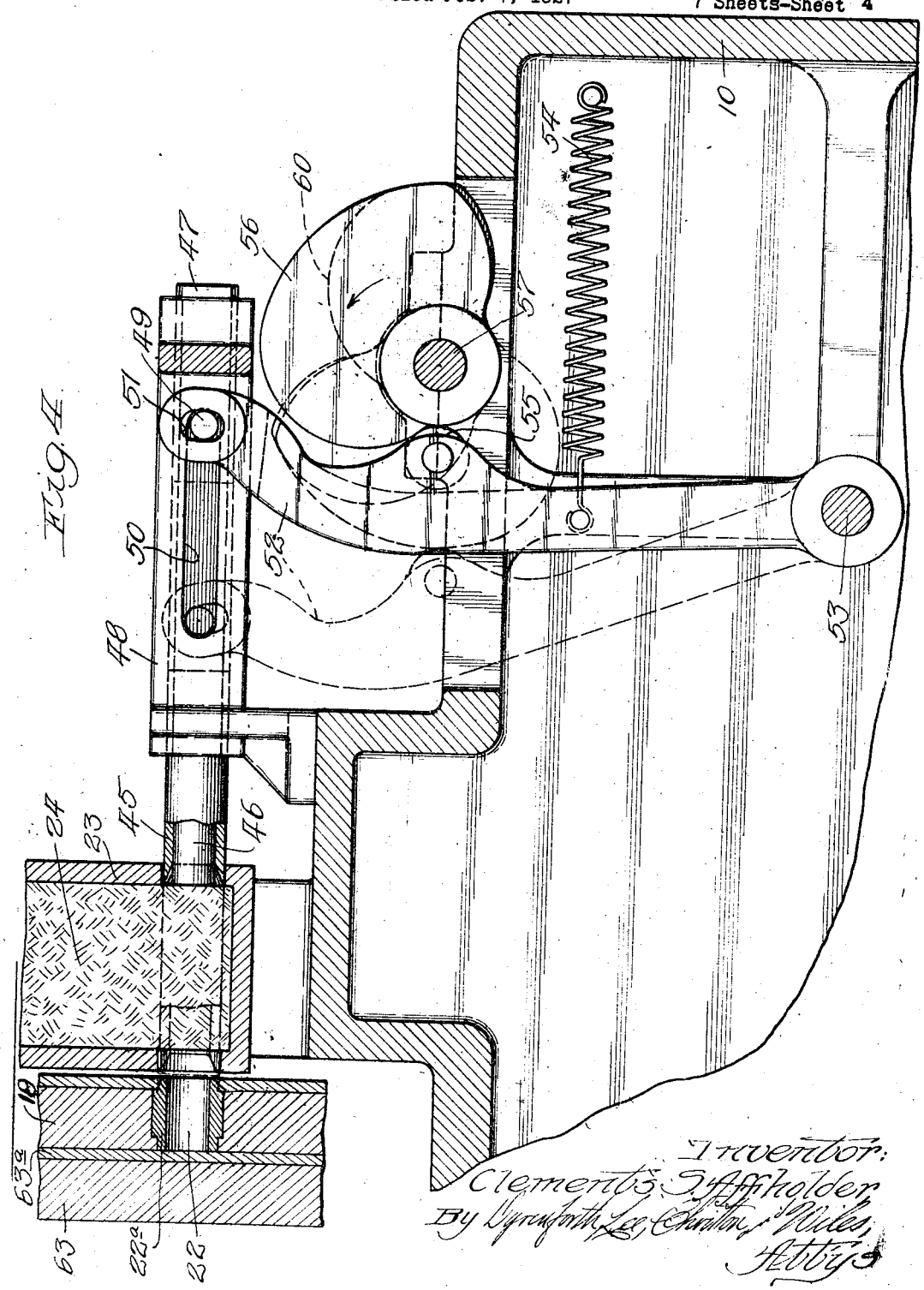

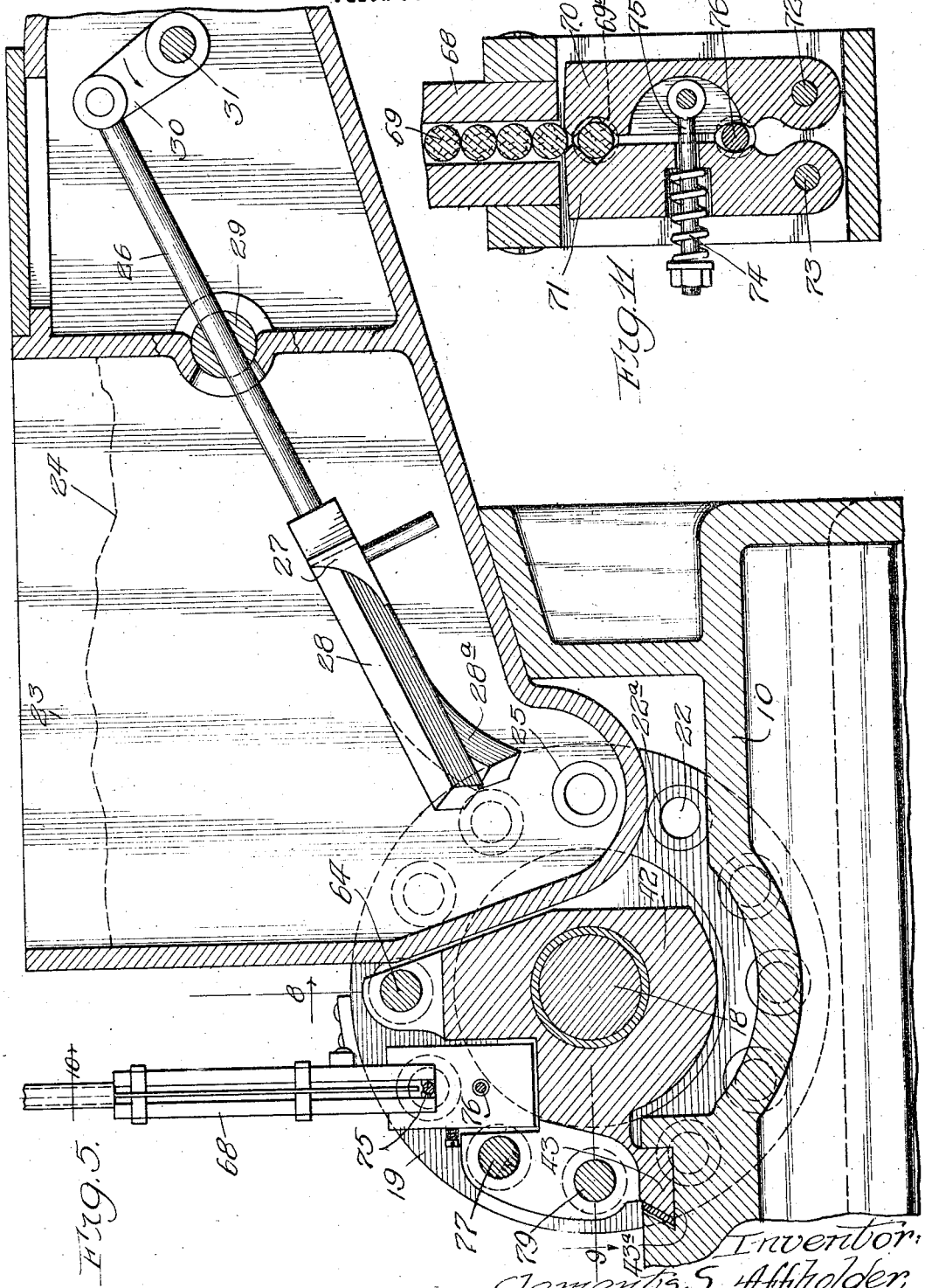

Oct. 18, 1927.  
C. S. AFFHOLDER  
1,645,678  
DRY CELL CORE MAKING MACHINE  
Filed Feb. 7, 1927   7 Sheets-Sheet 6
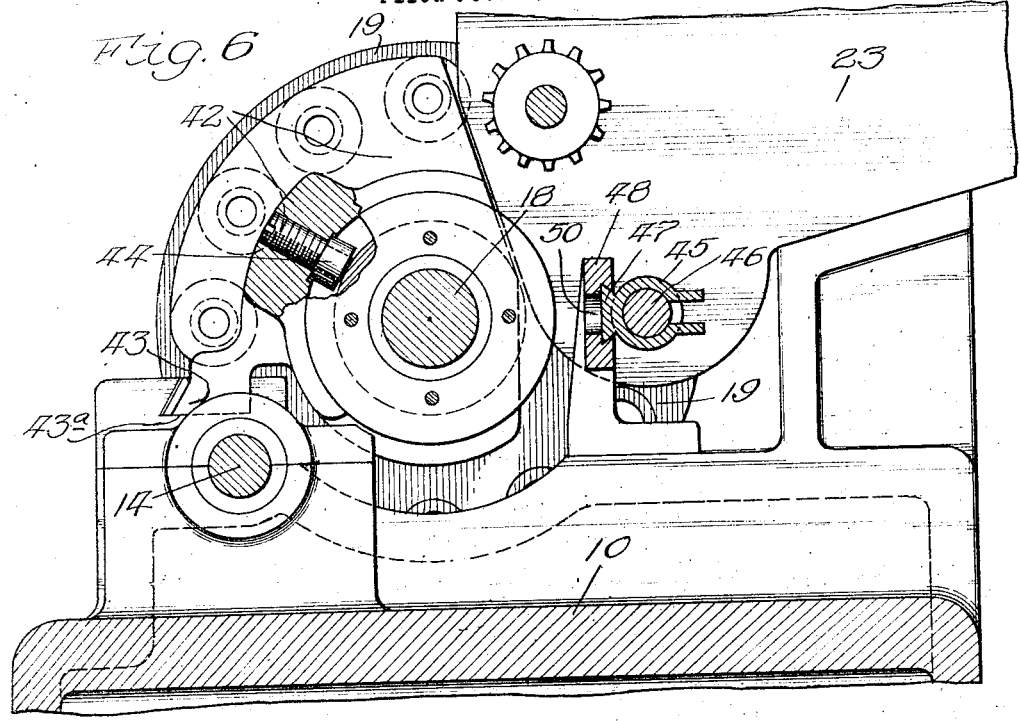
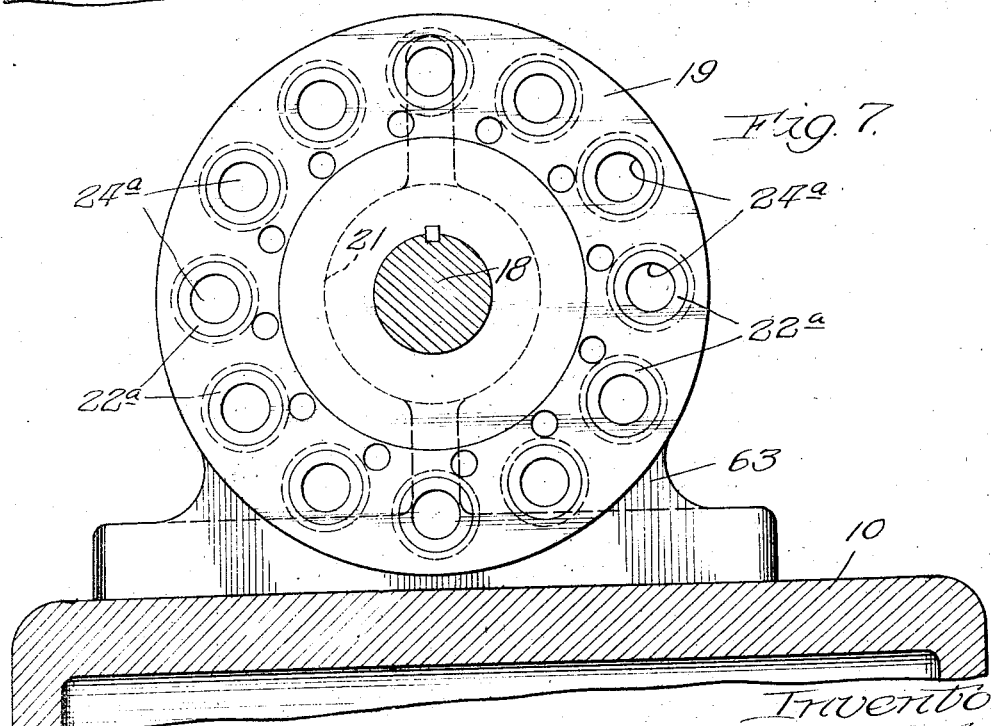

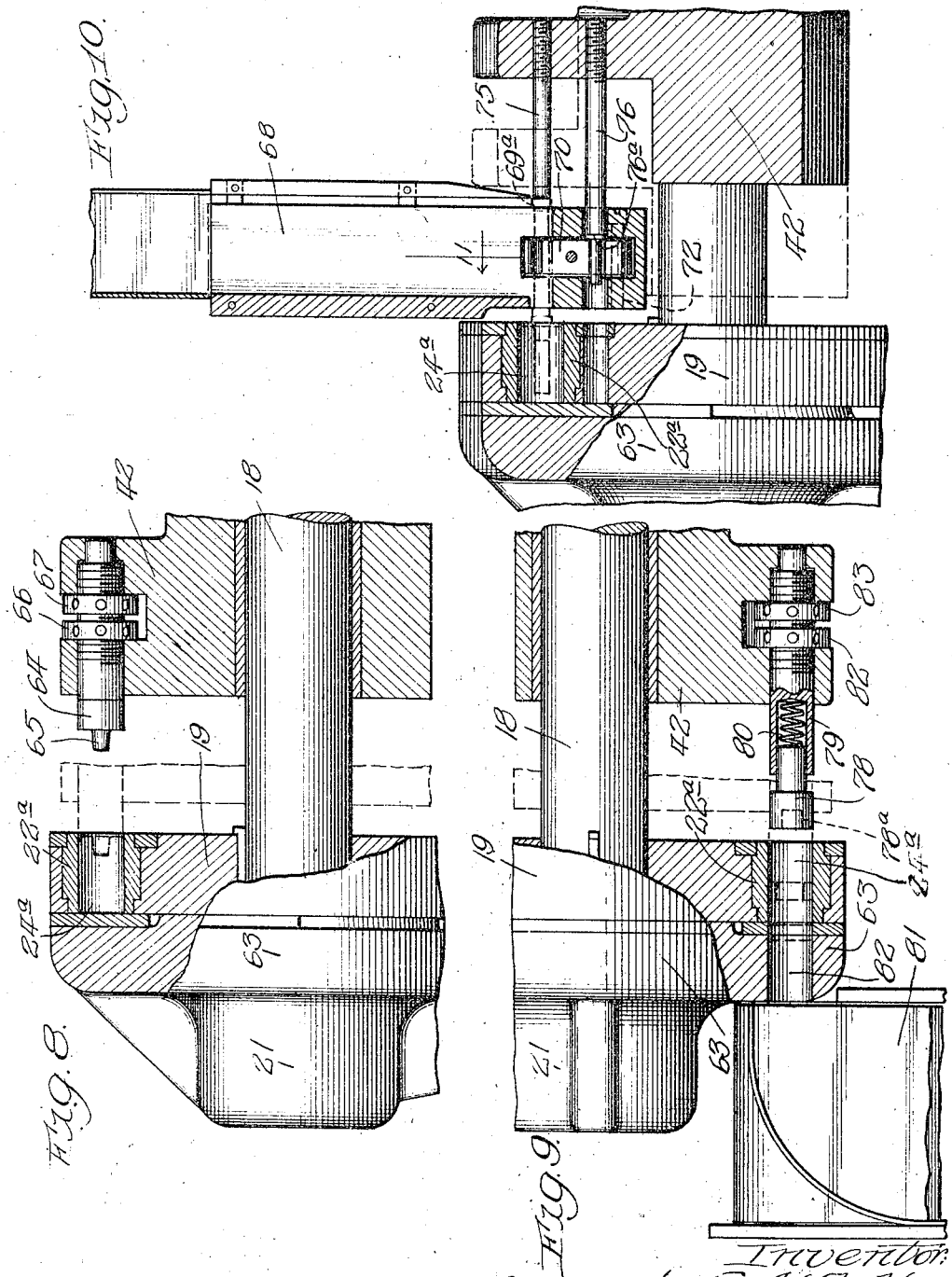

Patented Oct. 18, 1927.

1,645,678

UNITED STATES PATENT OFFICE.

CLEMENTS S. AFFHOLDER, OF MADISON, WISCONSIN, ASSIGNOR TO FRENCH BATTERY COMPANY, A CORPORATION OF WISCONSIN.

DRY-CELL-CORE-MAKING MACHINE.

Application filed February 7, 1927. Serial No. 166,394.

This invention relates to improvements in dry cell core-making machines. For example, the core of a dry cell of the kind now commonly used in flashlights, radio batteries, and the like, consists of a molded depolarizing mix having embedded therein a carbon pencil. The mix may comprise any suitable chemicals, for example, it may be a mixture of carbon graphite, manganese dioxide, and one or more chlorides. These chemicals, or others that may be used, are usually in powdered form, and in forming the core cell, a requisite amount must be measured out and suitably compressed and formed to give the right density and shape. In the formation of the core, the carbon pencil must also be inserted. My improved machine accomplishes these objects in a very simple and effective way.

My improved machine is also of strong construction, durable, and easy to operate.

Among the features of my invention is the provision of means whereby different steps in the process of manufacturing a core are carried on simultaneously, thus producing rapid operation.

Other features and advantages of my invention will appear more fully as I proceed with my specification.

Figure 1:
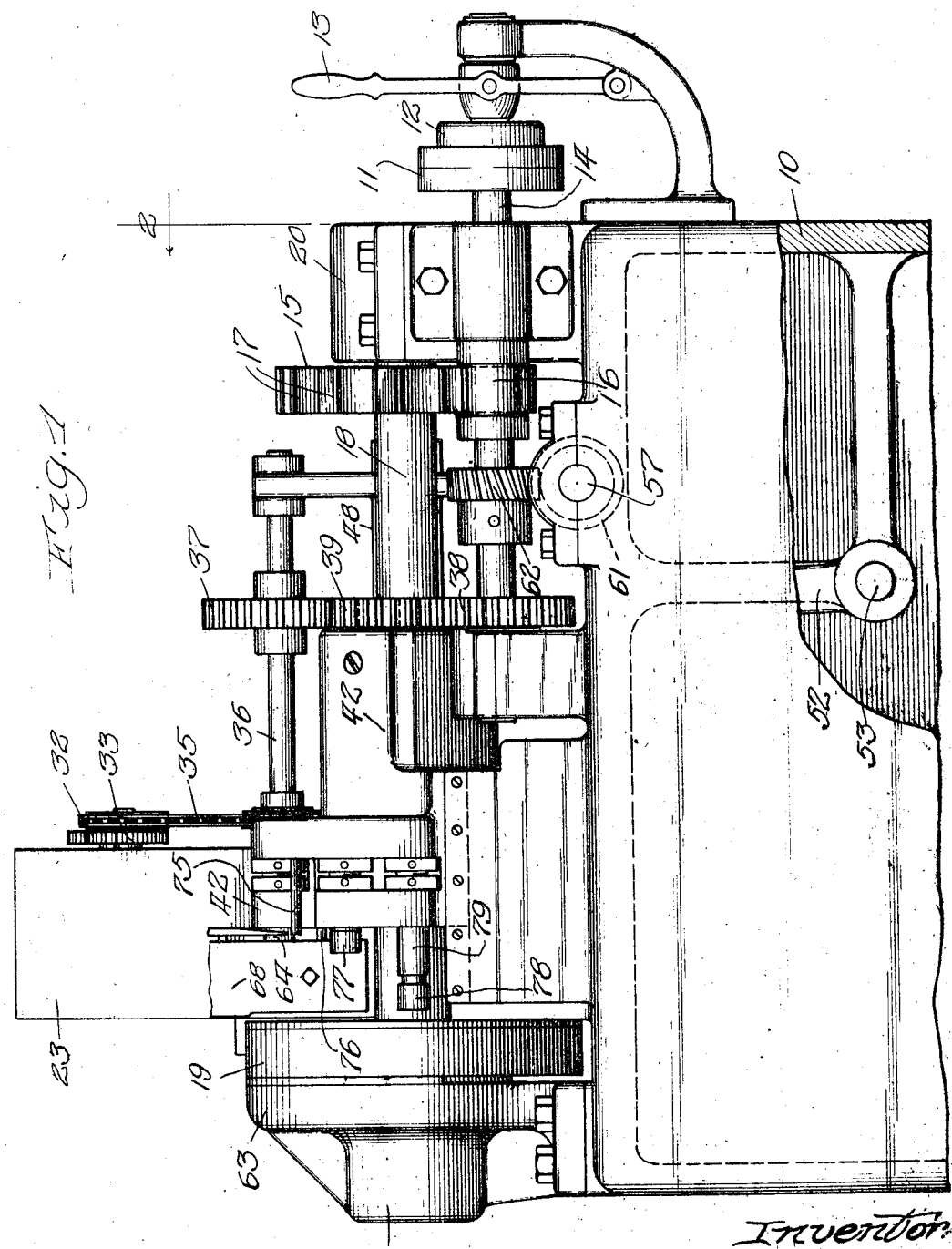
Figure 2:
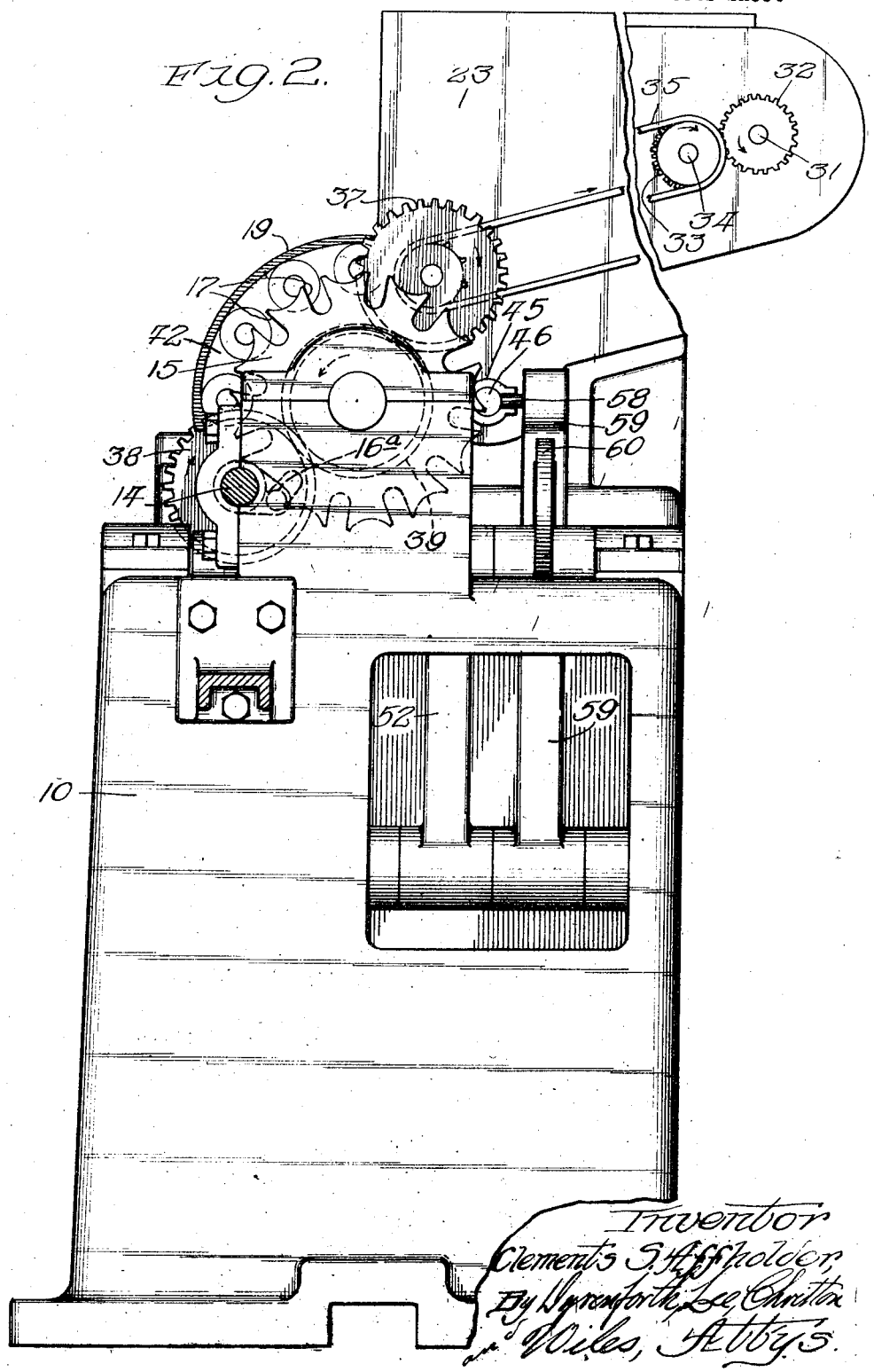
Figure 3:
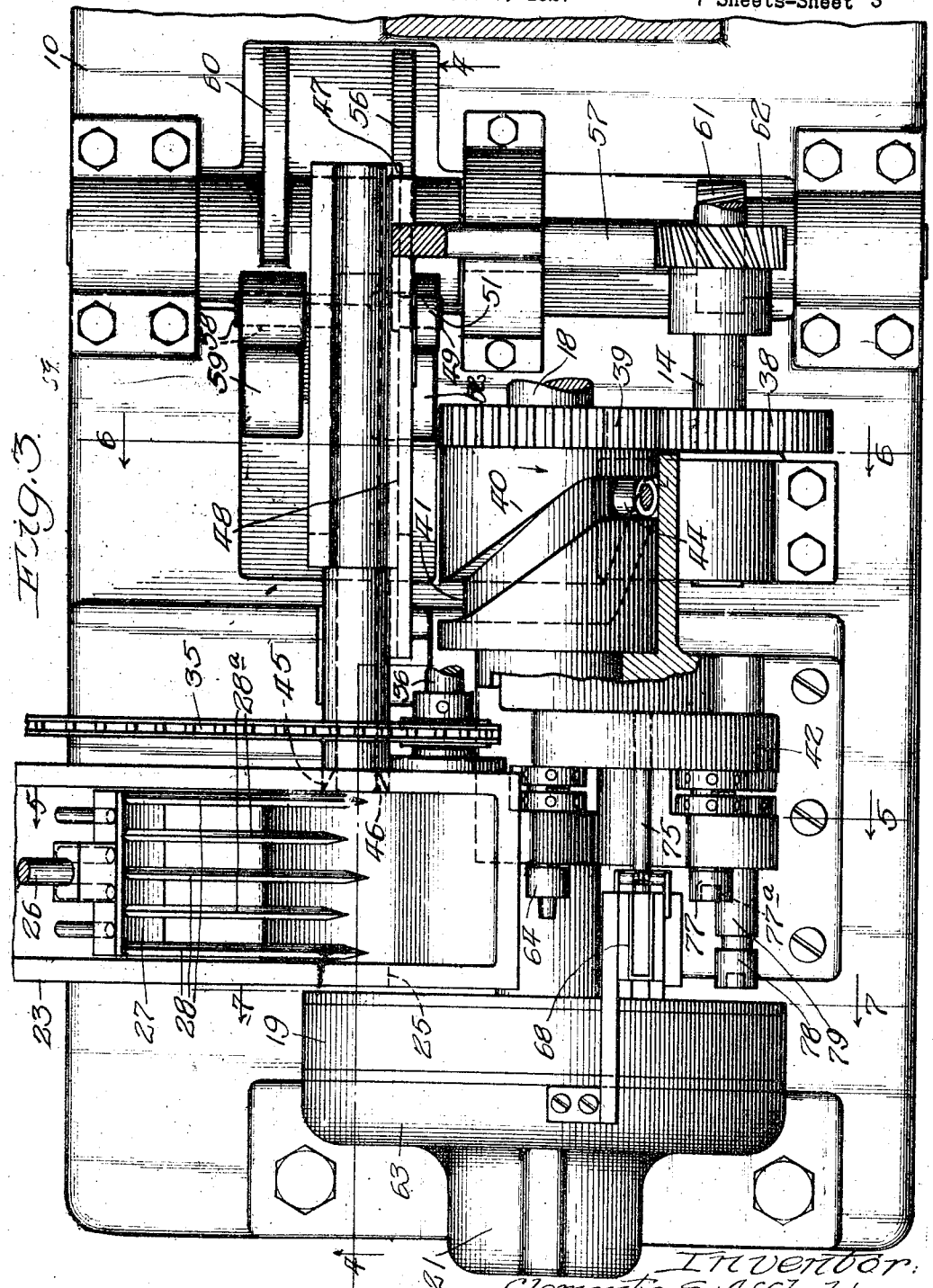

In that form of device embodying the features of my invention shown in the accompanying drawings, Fig. 1 is a view of the complete machine in side elevation, Fig. 2 is a view in end elevation taken as indicated by the line 2 of Fig. 1, Fig. 3 is a top plan view with the top of the case of the tool operating cam wheel removed, Fig. 4 is a view taken as indicated by the line 4 of Fig. 3, Fig. 5 is a view taken as indicated by the line 5 of Fig. 3, Fig. 6 is a view taken as indicated by the line 6 of Fig. 3, Fig. 7 is a view taken as indivated by the line 7 of Fig. 3, Fig. 8 is a view taken as indicated by the line 8 of Fig. 5, Fig. 9 is a view taken as indicated by the line 9 of Fig. 5, Fig. 10 is a view taken as indicated by the line 10 of Fig. 5, Fig. 11 is a view taken as indicated by the line 1 of Fig. 10.

A general description of the operation of the machine will facilitate an understanding of the invention. The machine comprises, in general, a hopper adapted to hold the mix in which there is a suitable agitator. Adjacent the mouth of the hopper is a rotatable mold cavity wheel. There is a measuring cup and a plunger associated therewith to force a certain predetermined amount of the mix into each mold cavity as it passes the mouth of the hopper. There is also provided a reciprocal work head carrying a plurality of tools, namely, a first tamper, a carbon pencil inserter, a final tamper, and an ejector, adapted to operate upon each one of the mold cavities in sequence. There is also provided means for rotating the cavity mold wheel one step at a time, and means for operating the work head for each movement of the cavity wheel.

I will now describe the construction and operation of the machine more in detail.

As shown in the drawings, 10 indicates a suitable supporting frame upon which the machine is formed. 11 indicates a drive-pulley adapted to be driven in any suitable manner as by means of a belt, and 12 indicates a suitable clutch of any desired construction adapted to be operated by the hand lever 13 in order to start or stop the machine in the usual manner. When the clutch is in, the wheel 11 drives the drive-shaft 14.

Any suitable mechanical movement is provided for causing the continuously rotating shaft 14 to rotate the wheel 15 intermittently. As here shown, the shaft 14 carries a pinion 16 with a single tooth $16^a$ adapted to engage in one of the recesses 17 in the periphery of the wheel 15 upon each rotation of the shaft 14. It will be seen that each rotation of the shaft 14 moves the wheel 15 a distance equal to the distance between the centers of two adjacent recesses 17, and that such wheel remains stationary from the time the tooth $16^a$ leaves one of such recesses until it engages the next.

The wheel 15 is mounted on the shaft 18 which in turn carries the mold cavity wheel 19. 20 and 21 indicate bearings for the ends of the shaft 18. The mold cavity wheel 19 is provided with a plurality (here shown as 12) of cylindrical openings 22 passing therethrough each surrounded by a bushing $22^a$ of suitable non-corrosive material. The recesses 17 in the periphery of the wheel 15 correspond in number to the mold cavities 22 so that with each movement of the wheel 15, the mold cavity wheel 19 moves a distance equal to the distance between the centers of two adjacent cavities 22.

23 indicates a hopper containing the mix 24, which is usually in powder form. This hopper is arranged just in front of the cavity wheel 19 and is provided with a mouth 25 adjacent the wheel 19, and so aligned that the mold cavities 22 will register with such mouth upon each movement of the wheel 19. Within the hopper 23 there is also provided an agitator comprising the reciprocating bar 26 carrying on its end the fork 27 with a series of prongs 28, alternating prongs being curved downwardly at their ends as indicated by 28ª. The bar 26 reciprocates in the bearing 29 and is operated by a crank 30 carried on the shaft 31, which in turn is driven by a pinion 32 operated by another pinion 33 on the stub shaft 34. The stub shaft 34 is adapted to be driven in any suitable manner as by means of the belt 35, which in turn is driven by a suitable belt wheel on the shaft 36 driven by the gear 37 meshing with the gear 38 on the shaft 14 through the intermediate gear 39, which is loosely mounted on the shaft 18.

The pinion 39 carries the tool operating cam 40 provided with the cam track or groove 41. 42 indicates a reciprocable work head slidably mounted on the shaft 18 and prevented from turning by the shoe 43 slidably mounted in a suitable guide 43ª. The work head is provided with a cam roller 44 lying within the cam track 41 of the cam wheel 40, and the cam track is so shaped (see Fig. 3) that upon each rotation of the cam wheel 40 the head 42 will be moved toward the wheel 19 and then back again. The cam is also provided with a flattened portion and the parts are so timed that the forward and backward movement of the cam will take place when the wheel 19 is stationary, and the work head will remain withdrawn from the wheel and stationary when the wheel 19 moves.

I will now describe the measuring cup and plunger or tamper used in connection with the hopper for placing the initial charge of mix in the cavity wheel (see Fig. 4). This apparatus comprises a reciprocable cup or sleeve 45 with the plunger or tamp 46 lying inside thereof. Both the cup and the plunger are adapted for reciprocable movement through the hopper 23 toward the cavity 22 lying in alignment with the mouth of the hopper. It will be seen by reference to Fig. 4 that the hopper is somewhat wider than the depth of the cavity 22, so that the amount of mix measured out by insertion of the sleeve 45 is considerably larger in volume than the cavity 22. This larger mass, however, is forced or tampered by the plunger 46 into the cavity 22, thus increasing its density to a certain extent. The measuring cup or sleeve 45 is provided with a shoe 47 operating in the guide 48 (see Fig. 6) and is adapted to be moved by a pin 49 projecting through the slot 50 in the guide 48. The pin 49 is embraced by an eye 51 on the upper end of the arm 52, which is pivotally mounted on the shaft 53 carried by the frame 10. A spring 54 serves to yieldingly hold the arm 52 in retracted position. The arm 52 is provided with an anti-friction roller 55 bearing against the cam 56, which is mounted on the shaft 57. The plunger or tamp 46 is adapted for reciprocable movement in a similar manner, except that it is slidably mounted within the sleeve 45 and is provided with a pin 58 engaged by an eye in the upper end of arm 59, which is similar to arm 52. The arm 59 is provided with an anti-friction roller similar to the roller 55 on the arm 52, which is engaged by the cam 60 (see Fig. 4), also mounted on the shaft 57.

The shaft 57 is continuously driven by the spiral gear 61, which in turn is operated by the spiral gear 62 on the shaft 14.

The rotation of the shaft 57 is so timed and the cams 56 and 60 are so shaped, that when one of the cavities 22 is adjacent the mouth of the hopper, the sleeve or measuring cup 45 will move through the hopper to the position indicated by the broken lines in Fig. 4, thus measuring out a charge of the mix. When the sleeve is in this position, the plunger or tamp 46 will be moved to the left (as viewed in Fig. 4) to force the mix in the measuring cup into the cavity 22 and compress the same therein. Both the sleeve and plunger are then withdrawn by means of the spring 54 and a similar spring (not shown) on the arm 59. After the cavity 22 has received its charge, the wheel 19 is rotated to bring the next cavity in line with the mouth. In this manner, each cavity 22 is filled with a charge of the mix as the wheel rotates.

Arranged back of the wheel 19 is a stationary disk or backing member 63, provided with a hardened non-corrosive plate 63ª lying back of the wheel 19 and forming a bottom for the mold cavities 22.

The work head 42 carries four tools, namely, a first tamper, a carbon pencil inserter, a second tamper, and an ejector, adapted to operate upon four cavities 22 simultaneously, that is, upon any one of said cavities in sequence, since the wheel 19 moves up one step for each operation of the work head. The first tamper is indicated by 64 (Fig. 8) and comprises a short rod with its end portion reduced in diameter as indicated by 65. Upon the movement of the work head 42, this tamper 64 compresses the mix more tightly in the cavity 22 and the point 65 forms a slight central depression in order to form a start for the carbon pencil to be inserted at the next step. The tamper 64 is located in a suitable bore in the head 42 and it is threaded and provided with two adjusting nuts 66 and 67 as shown in order to give proper adjustment.

The carbon pencil inserting mechanism is best shown in Figs. 5, 10 and 11. 68 indicates, in general, any suitable hopper adapted to contain a plurality of carbon pencils 69 and feed the same downwardly.

Below the hopper for the carbon pencils is a clamping device comprising the two jaws 70 and 71, pivoted at 72 and 73 respectively, and yieldingly held together by the springs 74 surrounding the arm 75 pivotally attached to the jaw 70 as shown. The head 42 carries a plunger 75 and a clamp releasing rod 76. The carbon pencils are ordinarily provided with heads 69a so that in forcing the pencil into the core it is necessary to open the jaws 70 and 71 of the clamp wide enough to permit the head 69a to pass therethrough. This is accomplished by the shoulder 76a on the rod 76. In the forward movement of the head 42 the rod 76 opens the jaws 70, 71, and the rod 75 forces one of the carbon pencils 69 into the mix in the cavity 22. Upon withdrawal of the head 42, the clamps 70 and 71 are held open just long enough by the rod 76 for another pencil to fall in between the same to be engaged by the rod 75 upon the next forward movement of the head.

The second tamper (see Fig. 3), as indicated by 77 is similar to the first tamper 64 and need not be described in detail. The only difference is that the second tamper 77 instead of being provided with the reduced portion 65 is provided with a recess 77a to accommodate the projecting end of the carbon pencil, which is in place when the second tamper operates.

The ejector (see Fig. 9) is indicated by 78 and is also provided at its end with a recess or cup 78a to accommodate the end of the carbon pencil. The ejector 78 is slidably mounted in a sleeve 79 and is pressed forwardly by means of a spring 80. In the forward movement of the head 42 the spring 80 is compressed and when the core is almost out of the cavity 22 this spring expands to throw the core a slight distance beyond the wheel, where it falls upon a suitable conveyor 81. The backing member 63 is provided with a hole 82 opposite the cavity 22 when it is in line with the ejector and the completed core is thrown through this hole onto the conveyor 81. The member 79 carrying the ejector 78 is provided with adjusting nuts 82 and 83 similar to the adjusting nuts 66 and 67 on the first tamper 64.

It is believed that the operation of the device is now clear. The agitator in the hopper 23 is driven continuously. The cavity wheel 19 is moved intermittently. As each cavity is placed in position opposite the mouth of the hopper, the measuring cup 45 moves forward to engage and measure out a predetermined amount of the mix. This is immediately followed by the plunger 46 which forces this amount of mix out of the measuring cup into the adjacent cavity 22. The wheel 19 then moves up a step and the next cavity is likewise filled. When the cavity comes opposite the first tamper 64, this is moved forward by the reciprocable work head 42 and the charge is tamped in the cavity and a small depression is formed to receive the carbon pencil. At the next step the carbon pencil is inserted as has been described before. At the next step the final tamp is given by means of the tool 77, and at the last step the complete core is ejected by means of the ejector 78.

It may be added that the feature of a measuring tube charged by plunging the tube into the mix is important. The method involved results in isolating an accurately measured charge, and then forcing the charge into the mold-cavity where it is formed into a suitably compacted core. This results in great uniformity of product and incidentally eliminates waste. Obviously, the principle may be given other embodiments than that used in illustrating the invention.

While I have shown and described a certain embodiment of my invention, it is to be understood that the invention is capable of many modifications. Changes, therefore, in the construction and arrangement may be made without departing from the spirit and scope of the appended claims, in which it is my intention to claim all novelty inherent in my invention as broadly as possible in view of the prior art.

What I claim as new, and desire to secure by Letters Patent, is:

1. In a device of the character described; a hopper provided with a mouth; a mold cavity adjacent said mouth; a tubular measuring sleeve adapted to be forced longitudinally through material in said hopper to a position with one end adjacent said mouth; and a plunger in said sleeve adapted to be forced therethrough to eject material from said sleeve into said mold cavity and compress the same therein.

2. In a device of the character described; a hopper provided with a mouth; a wheel provided with mold cavities adjacent said mouth; means for rotating said wheel to bring said mold cavities into registration with said mouth; a tubular measuring sleeve adapted to be forced longitudinally through material in the hopper to a position with its open end adjacent said mouth; and a plunger in said sleeve adapted to be forced therethrough to eject material from said sleeve into a mold cavity adjacent said mouth and compress the same therein.

3. In a device of the character described; a hopper provided with a mouth and an opening opposite said mouth; a mold cavity adjacent said mouth; a tubular measuring sleeve; means for forcing said measuring sleeve longitudinally through said opening in said hopper to a position with its open end adjacent said mouth of said hopper; a plunger adapted for sliding movement in said sleeve; and means for forcing said plunger through said sleeve to eject material therein from said sleeve into a mold cavity opposite said mouth and compress the same therein.

4. In a device of the character described; a rotatable wheel mounted on a horizontal axis and having a plurality of mold cavities extending therethrough; a backing plate adjacent said wheel and forming a bottom for said mold cavities; a hopper adjacent said mold cavity wheel and having a mouth; means for moving the mold cavity wheel intermittently to bring the mold cavities therein in registry with the mouth of said hopper in succession; means for filling each mold cavity with material in the hopper as it comes into position adjacent the mouth of said hopper; a reciprocable work head; means for reciprocating said work head for each movement of the mold cavity wheel; and a plurality of tools carried by the work head to perform successive operations on the charge in each mold cavity.

5. In a device of the character described; a rotatable wheel mounted on a horizontal axis and having a plurality of mold cavities extending therethrough; a backing plate adjacent said wheel and forming a bottom for said mold cavities; a hopper adjacent said mold cavity wheel and having a mouth; means for moving the mold cavity wheel intermittently to bring the mold cavities therein in registry with the mouth of said hopper in succession; means for filling each mold cavity with material from the hopper as it comes into position adjacent the mouth of said hopper; a reciprocable work head; means for reciprocating said work head for each movement of the mold cavity wheel; and a plurality of tools carried by the work head to perform successive operations on the charge in each mold cavity, said tools comprising a first tamper, a carbon pencil inserter, a second tamper, and an ejector.

6. In a device of the character described; a rotatable wheel mounted on a horizontal axis and having a plurality of mold cavities extending therethrough; a backing plate adjacent said wheel and forming a bottom for said mold cavities; a hopper adjacent said wheel and having a mouth; means for intermittently rotating said wheel to bring said mold cavities in registry with said mouth in succession; means for filling each mold cavity with material from said hopper when it is in position adjacent said mouth; a reciprocable work head; means for moving said work head towards said mold cavity wheel upon each movement thereof; and a plurality of tools carried by said work head adapted to perform successive operations upon the charge in each mold cavity as said wheel rotates.

7. In a device of the character described; a rotatable wheel mounted on a horizontal axis and having a plurality of mold cavities extending therethrough; a backing plate adjacent said wheel and forming a bottom for said mold cavities; a hopper adjacent said wheel and having a mouth; means for intermittently rotating said wheel to bring said mold cavities in registry with said mouth in succession; means for filling each mold cavity with material from said hopper when it is in position adjacent said mouth; a reciprocable work head; means for moving said work head towards said mold cavity wheel upon each movement thereof; and a plurality of tools carried by said work head adapted to perform successive operations upon the charge in each mold cavity as said wheel rotates, said tools including a tamper, a carbon pencil inserter, a second tamper, and an ejector.

8. In a device of the character described; a hopper provided with a mouth; an agitator in said hopper; a mold cavity adjacent said mouth; a tubular measuring sleeve adapted to be forced longitudinally through material in said hopper to a position with one end adjacent said mouth; and a plunger in said sleeve adapted to be forced therethrough to eject material from said sleeve into said mold cavity and compress the same therein.

9. In a device of the character described; a hopper provided with a mouth and adapted to contain a mix; a mold cavity adjacent said mouth; means for inserting in the mold cavity a charge of mix from the mouth of the hopper; and means for inserting a carbon pencil in the mix in the mold cavity, said last mentioned means comprising a clamp adapted to hold the carbon pencil in alignment, a clamp jaw separator and a plunger adapted to press the carbon pencil into the charge in the mold cavity.

10. In a device of the character described; a mold wheel rotatably mounted on a horizontal axis and provided with a plurality of mold cavities extending therethrough; a hopper arranged adjacent said wheel and provided with a mouth; means for intermittently rotating said wheel to bring said mold cavities in registry with said mouth in succession; means for introducing a charge of material from said hopper into a mold cavity adjacent said mouth, said means including a measuring sleeve adapted to be forced through material in the hopper to bring its open end adjacent said mouth; and a plunger adapted to be forced through said sleeve to eject material therefrom into said mold cavity and compress the same therein; a reciprocable work head; means for reciprocating said work head toward and away from said wheel upon each movement of said wheel; and a plurality of tools carried by said work head and adapted to perform successive operations upon the charge in each mold cavity as the wheel is rotated.

11. In a core making machine, a hopper for the mix, an intermittently rotated mold cavity carrying wheel adjacent the hopper and provided with a series of open-ended mold cavities, a longitudinally reciprocable tubular measuring sleeve receiving its supply from said hopper, a mix ejecting plunger working through said sleeve and operating to fill the mold cavities, in turn, from said sleeve, carbon inserting means, and core ejecting means.

12. In a core making machine, the combination of a hopper for the mix, a movable mold cavity carrying member adjacent the lower portion of the hopper and provided with a series of open-ended mold cavities, means for intermittently actuating the wheel, a longitudinally reciprocable tubular measuring sleeve working through the lower portion of said hopper, and a plunger working through said measuring sleeve and serving to eject mix therefrom into the mold cavities in said wheel, in turn.

13. In a core making machine, the combination of a hopper for the mix, a movable mold cavity carrying member adjacent the lower portion of the hopper and provided with a series of open-ended mold cavities, means for intermittently actuating the wheel, a longitudinally reciprocable tubular measuring sleeve working through the lower portion of said hopper, and a plunger working through said measuring sleeve and serving to eject mix therefrom into the mold cavities in said wheel, in turn.

14. In a core-making machine, a chamber containing the mix, an intermittently rotated mold-cavity wheel, a longitudinally reciprocable tubular measuring sleeve receiving its supply from said chamber, and a mix-ejecting plunger working through said sleeve and operating to fill the mold-cavities, in turn, from said sleeve.

15. In a core-making machine, a mix-chamber, mold-carrying means, a tubular measuring sleeve adapted to be charged by plunging longitudinally through the mix in said chamber, and a mix-ejecting plunger adapted to force the charge from the measuring sleeve into a mold-cavity.

In testimony whereof, I have hereunto set my hand this 28th day of January, A. D. 1927.

CLEMENTS S. AFFHOLDER.